United States Patent
Kasahara et al.

(10) Patent No.: US 6,798,884 B1
(45) Date of Patent: Sep. 28, 2004

(54) ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM

(75) Inventors: Masao Kasahara, Minoo (JP); Yasuyuki Murakami, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/397,677

(22) Filed: Sep. 16, 1999

(30) Foreign Application Priority Data

Sep. 16, 1998 (JP) .......................................... 10-262037
Apr. 13, 1999 (JP) .......................................... 11-105814

(51) Int. Cl.⁷ .............................. H04L 9/00; H04K 1/00
(52) U.S. Cl. .......................................... 380/28; 380/30
(58) Field of Search ............................................ 380/28

(56) References Cited

U.S. PATENT DOCUMENTS 4,218,582 A * 8/1980 Hellman et al. .............. 380/30
4,399,323 A * 8/1983 Henry .......................... 380/30

OTHER PUBLICATIONS

"Merkle Hellman Revisited: A Cryptanalysis of the Qu–Vanstone Cryptosystem Based on Group Facorizations", Phong Nguyen and Jacques Stern; 1998 pp. 207–208.*

Sakai, et al., "Notes on Product–Sum Type Public Key Cryptosystem" Technical Report of IEICE, The Institute of Electronics Information and Communication Engineers, ISEC99–46 (1999–9), pp. 61–66.

Hideo Shimizu, "On the Security of Kasahara–Murakami Public–Key Cryptosystem", Yokohama Research Center, Telecommunications Advancement Organization of Japan, Technical Report of IEICE, The Institute of Electronics, Information and Communication Engineers, ISEC99–56 (1999–11), pp. 29–35.

* cited by examiner

Primary Examiner—Gregory Morse
Assistant Examiner—Christopher J. Brown
(74) Attorney, Agent, or Firm—Hogan & Hartson, LLP

(57) ABSTRACT

A product-sum type cryptosystem is employed to obtain ciphertext $C = m_0 D_0 + m_1 D_1 + \ldots + m_{K-1} D_{K-1}$ by (an) inner product(s) using a plaintext vector $m = (m_0, m_1, \ldots, m_{K-1})$ and base vectors $D = (D_0, D_1, \ldots, D_{K-1})$. $D_i$ ($0 \le i \le K-1$) is set to $D_i = d/d_i$, where $d = d_0 d_1 \ldots d_{K-1}$, and any two numbers $d_i$ and $d_j$ are prime relative to each other.

23 Claims, 1 Drawing Sheet

ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM

This application relates to two applications concurrently filed herewith entitled (1) "CRYPTOGRAPHIC COMMUNICATION METHOD, ENCRYPTION METHOD, AND CRYPTOGRAPHIC COMMUNICATION SYSTEM" that claims foreign priority based on Japanese patent applications 10-262035, filed Sep. 16, 1998 and 10-338190, filed Nov. 27, 1998 inventors: Masao Kasahara and Yasuyuki Murakami; Express Mail EL 446 156 915 US) and (2) "ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM" that claims foreign priority based on Japanese patent applications 10-262036, filed Sep. 16, 1998 and 11-105815, filed Apr. 13, 1999 inventors: Masao Kasahara and Yasuyuki Murakami; Express Mail EL 446 156 827 US), which applications are hereby incorporated by reference in their entirety.

BACKGROUND OF THE INVENTION

1. Field of the Invention

This invention relates to an encryption method for converting plaintext into ciphertext, and to a decryption method for converting ciphertext into the original plaintext, and more particularly relates to product-sum type cryptosystem.

2. Description of the Related Art

In today's world, characterized by sophisticated information utilization, important business document and image information are transmitted and communicated in the form of electronic information over an infrastructure of computer networks. By its very nature, electronic information can be easily copied, making it extremely difficult to distinguish between the copy and the original, and information security has become a very serious problem. The realization of computer networks which support "computer resource sharing," "multi-accessing," and "wide-area implementation" is particularly indispensable to the establishment of a high-level information society. However, that very realization involves factors that are in conflict with the goal of information security between involved parties. An effective technique for eliminating those inconsistencies is encryption technology, whichup until now, in the course of human history, has been primarily used in the fields of military operations and foreign diplomacy.

Cryptography is the exchange of information in such a way that the meaning of that information cannot be understood by anyone other than the authorized parties. In cryptography, the conversion of the original text (plaintext), that is understandable by anyone, to a text (ciphertext), the meaning of which is not understood by a third party is called encryption, and the changing of ciphertext into plaintext is decryption. The overall process of this encryption and decryption is called a cryptosystem. In the encryption process and decryption process, respectively, secret data called an encryption key and a decryption keys are employed. Since a secret decryption key is necessary for decryption, only a party who knows that decryption key can decrypt the ciphertext, enabling the confidentiality of the information to be maintained in accordance with encryption.

Generally, there are two types of encryption schemes. Namely common key encryption scheme and public key encryption scheme. In a common key encryption scheme, the encryption key and the decryption key are identical, and cryptographic communication is conducted with the identical keys in the possession of both the sending party and the receiving party. The sending party encrypts plaintext based on the common key and sends it to the receiving party, whereupon the receiving party uses the common key to decrypt the ciphertext into the original plaintext.

By contrast, in a public key encryption scheme, the encryption key and decryption key are different. In conducting cryptographic communications in this system, the sending party encrypts the plaintext with the public key of a receiving party, and the receiving party decrypts that ciphertext with his or her own secret key. The public key is used for encryption, and the secret key is a key for decrypting the ciphertext encrypted by the public key. The ciphertext encrypted by the public key can only be decrypted using a secret key.

New methods for product-sum type cryptosystem, which is one public key encryption scheme, as well as attack methods (methods for breaking the codes), are being proposed one after another. A particularly urgent task is now that of developing cryptographic techniques capable of high-speed decryption so as to enable large volumes of information be processed in short times.

SUMMARY OF THE INVENTION

An object of the present invention, which was devised in view of the situation described in the foregoing, is to provide a new encryption method and decryption method for product-sum type cryptosystem wherewith high-speed decryption processing is possible.

Another object of the present invention is to provide an encryption method and decryption method wherewith vulnerability to attack by the LLL (Lenstra-Lenstra-Lovasz) method is minimized and security is enhanced.

According to the first aspect of the present invention, there is provided an encryption method comprising the step of preparing a plaintext vector $m=(m_0, m_1, \ldots, m_{K-1})$ that is obtained by dividing plaintext by K, the step of preparing base vectors $D=(D_0, D_1, \ldots, D_{K-1})$, with $D_i$ ($0 \leq i \leq K-1$) being set to $D_i = d/d_i$ (where $d = d_0 d_1 \ldots d_{K-1}$, and any two numbers $d_i$ and $d_j$ are prime relative to each other), and the step of yielding ciphertext $C = m_0 D_0 + m_1 D_1 + \ldots + m_{K-1} D_{K-1}$ from the plaintext vector m and base vectors D.

Random number vectors $v=(v_0, v_1, \ldots, v_{K-1})$ may further be used to yield ciphertext $C = m_0 v_0 D_0 + m_1 v_1 D_1 + \ldots + m_{K-1} v_{K-1} D_{K-1}$. A plurality of sets each containing K terms of $d_i$ (i=0, 1, 2, \ldots, K-1) elements may be provided, and ciphertext is obtained for each of those sets, respectively.

According to the second aspect of the present invention, there is provided an encryption method comprising the step of preparing a plaintext vector $m=(m_0, m_1, \ldots, m_{K-1})$ that K-divides plaintext, the step of preparing base vectors $D=(D_0, D_1, \ldots, D_{K-1})$, with $D_i$ ($0 \leq i \leq K-1$) being set to $D_i = (d/d_i) v_i$ (where $d = d_0 d_1 \ldots d_{K-1}$, any two numbers $d_i$ and $d_j$ are prime relative to each other, and $v_i$ is a random number), and the step of yielding ciphertext $C = m_0 D_0 + m_1 D_1 + \ldots + m_{K-1} D_{K-1}$ from the plaintext vector m and base vectors D.

A plurality of sets each containing K terms of $d_i$ (i=0, 1, 2, \ldots, K-1) elements may be provided, and ciphertext is obtained for each of those sets, respectively.

According to the third aspect of the present invention, there is provided a decryption method for decrypting the ciphertext C encrypted by any of the above described encryption methods, wherein the plaintext vector $m=(m_0, m_1, \ldots, m_{K-1})$ is found by formula (a) below.

$$m_i = CD_i^{-1} \pmod{d_i} \qquad (a)$$

According to the fourth aspect of the present invention, there is provided an encryption/decryption method comprising the steps of:

providing a plaintext vector $m=(m_0, m_1, \ldots, m_{K-1})$ that K-divides plaintext;

providing base vectors $D=(D_0) D_1, \ldots, D_{K-1})$, with $D_i$ ($0 \leq i \leq K-1$) being set to $d/d_i$, using the integer $d_i$, (where $d=d_0 d_1 \ldots d_{K-1}$, and any two numbers $d_i$ and $d_j$ are prime relative to each other);

selecting w to satisfy w<P (P=prime number), and finding a public key vector $c=(c_0, c_1, \ldots, c_{K-1})$ from formula (b), $$c_i = wD_i \pmod{P} \qquad (b);$$

producing the ciphertext C indicated in formula (c) from the inner product of a plaintext vector m and public key vector c, $$C = m_0 c_0 + m_1 c_1 + \ldots + m_{K-1} c_{K-1} \qquad (c)$$

finding intermediate decrypted text M for the ciphertext C from formula (d), $$M = w^{-1} C \pmod{P} \qquad (d);$$

finding the plaintext vector $m=(m_0, m_1, \ldots, m_{K-1})$ by decrypting that intermediate decrypted text M by formula (e) below, $$m_i = MD_i^{-1} \pmod{d_i} \qquad (e); \text{ and}$$

obtaining the original text from the plaintext vector m.

According to the fifth aspect of the present invention, there is provided an encryption/decryption method comprising the steps of:

providing a plaintext vector $m=(m_0, m_1, \ldots, m_{K-1})$ that K-divides plaintext;

providing base vectors $D=(D_0, D_1, \ldots, D_{K-1})$, with $D_i$ ($0 \leq i \leq K-1$) being determined by equation (f), $$D_i = (d/d_i) v_i \qquad (f)$$

where
 $v_i$ is a random number,
 $d_i$ is an integer, and
 $d = d_0 d_1 \ldots d_{K-1}$
 and where any two integers $d_i$ and $d_j$ are prime relative to each other);

selecting w to satisfy w<P (P=prime number), and finding a public key vector $c=(c_0, c_1, \ldots, c_{K-1})$ from formula (g), $$c_i = wD_i \pmod{P} \qquad (g);$$

producing the ciphertext C indicated in formula (h) from the inner product of a plaintext vector m and public key vector $$C = m_0 c_0 + m_1 c_1 + \ldots + m_{K-1} c_{K-1} \qquad (h);$$

finding intermediate decrypted text M for ciphertext C from formula (i), $$M = w^{-1} C \pmod{P} \qquad (i);$$

finding the plaintext vector $m=(m_0, m_1, \ldots, m_{K-1})$ by decrypting that intermediate decrypted text M by formula (j) below, $$m_i = MD_i^{-1} \pmod{d_i} \qquad (j); \text{ and}$$

obtaining the original plaintext from the plaintext vector m.

According to the sixth aspect of the present invention, there is provided an encryption/decryption method comprising the steps of:

providing a plaintext vector $m=(m_0, m_1, \ldots, m_{K-1})$ that K-divides plaintext;

providing prime numbers P and Q;

providing a base vector D $(D_0, D_1, \ldots, D_{K-1})$ with $D_{Pi}$ ($0 \leq i \leq K-1$) satisfying $D_{Pi} = d_P / d_{Pi}$, using the integer $d_{Pi}$, (where $d_P = d_{P0} d_{P1} \ldots d_{PK-1}$; and any two numbers $d_{Pi}$ and $d_{Pj}$ are prime relative to each other);

providing another base vector $D=(D_0 D_1, \ldots, D_{K-1})$ with $D_{Qi}$ ($0 \leq i \leq K-1$) satisfying $D_{Qi} = d_Q / d_{Qi}$, using the integer $d_{Qi}$, (where $d_Q = d_{Q0} d_{Q1} \ldots d_{QK-1}$, and any two numbers $d_{Qi}$ and $d_{Qj}$ are prime relative to each other);

deriving a minimum integer $D_i$ such that remainders resulting by P and Q become $D_{Pi}$ and $D_{Qi}$, respectively, using the Chinese remainder theorem;

selecting w to satisfy w<N (N=PQ), and finding a public key vector $c=(c_0, c_1, \ldots, c_{K-1})$ from formula (k), $$c_i = wD_i \pmod{N} \qquad (k);$$

producing the ciphertext C indicated in formula (l) from the inner product of a plaintext vector m and public key vector c, $$C = m_0 c_0 + m_1 c_1 + \ldots + m_{K-1} c_{K-1} \qquad (l)$$

finding intermediate decrypted text $M_P$ and $M_Q$, with modulus P and modulus Q, for the ciphertext C, as in formulas (m) and (n), $$M_P = w^{-1} C \pmod{P} \qquad (m),$$
$$M_Q = w^{-1} C \pmod{Q} \qquad (n),$$

finding a pair of remainders $(m_i^{(P)}, m_i^{(Q)})$ by decrypting the intermediate decrypted-text $M_P$ and $M_Q$ by formulas (o) and (p) below, $$m_i^{(P)} = M_P D_{Pi}^{-1} \pmod{d_{Pi}} \qquad (o),$$
$$m_i^{(Q)} = M_Q D_{Qi}^{-1} \pmod{d_{Qi}} \qquad (p);$$

applying the Chinese remainder theorem to $m_i^{(P)}$ and $m_i^{(Q)}$ to find the plaintext vector $m=(m_0, m_1, \ldots, m_{K-1})$; and obtaining the original plaintext from the plaintext vector m.

The ciphertext C may be sent with the N as modulus.

According to seventh aspect of the present invention, there is provided a cryptographic communications system for conducting information communications between a plurality of entities using ciphertext, comprising: an encryptor for producing ciphertext from plaintext using any one of the above described encryption methods; a communication path for transmitting the produced ciphertext from one entity to another entity or entities; and a decryptor for decrypting transmitted ciphertext to the original plaintext.

According to the eighth aspect of the present invention, there is provided an encryption method for obtaining ciphertext from components of a plaintext vector and components of one of multiple types of base vectors, wherein the ciphertext is generated containing information indicative of which base vector (or vector component(s)) has been used. The plaintext vector is obtained by dividing the plaintext.

According to the ninth aspect of the present invention, there is provided an encryption method for obtaining ciphertext from plaintext, comprising the steps of:

providing a plaintext vector $m=(m_1, m_2, \ldots, m_{K-1})$ that $(K-1)$-divides the plaintext;

providing first base vectors $D_P=(D_{P0}, D_{P1}, \ldots, D_{PK-1})$ which is set to $D_{Pi}=d_{P0}d_{P1} \ldots d_{PK-1}/d_{Pi}$ with integers $d_{Pi}$ ($0 \leq i \leq K-1$) and second base vectors $D_Q=(D_{Q0}, D_{Q1}, \ldots, D_{QK-1})$ which is set to $D_{Qi}=d_{Q0}d_{Q1} \ldots d_{QK-1}/d_{dQi}$ with integers $d_{Qi}$ ($0 \leq i \leq K-1$);

discretionarily selects either $D_{Pi}$ or $D_{Qi}$ as $D_i$; and obtaining ciphertext $c=m_0D_0+m_1D_1+ \ldots +m_{K-1}D_{K-1}$ with $m_0$ indicating $D_{Pi}/D_{Qi}$ selection information.

According to the tenth aspect of the present invention, there is provided a decryption method for decrypting the ciphertext C encrypted by the encryption method described just above, wherein components of the plaintext vector m forming products with $D_{Pi}$ in the ciphertext C and the $m_0$ are decrypted; and components of the plaintext vector m forming products with $D_{Qi}$ in the ciphertext C are next decrypted.

The concept of the encryption and decryption methods of the present invention is now described.

Let a set $\{d_i\}$ be considered which contains K integer elements. Arbitrary two integer elements among this set are prime. The product of these K elements is represented by d, as given in equation (1) below, and the base $D_i$ is defined as in equation (2).

$$d=d_0d_1 \ldots d_{K-1} \tag{1}$$

$$D_i=d/d_i \tag{2}$$

Now, a message $m=(m_0, m_1, \ldots, m_{K-1})$ is represented as given in equation (3) below, using the base $D=(D_0, D_1, \ldots, D_{K-1})$.

$$M=m_0D_0+m_1D_1+ \ldots +m_{K-1}D_{K-1} \tag{3}$$

Here, the elements $m_i$ in the message vector m are set so as to satisfy $m_i<d_i$.

In the present invention, ciphertext is produced in this manner, that is, using equations (1) to (3).

When the base is given by equation (2), the message $m=(m_0, m_1, \ldots, m_{K-1})$ can be decrypted from the integer M using the algorithm noted below. This decryption algorithm is called a parallel decryption algorithm.

Parallel Decryption Algorithm unit i ($m_i$ decryption)

$$m_i=MD_i^{-1} \pmod{d_i}$$

Encryption techniques based on this concept and the decryption methods therefor are subject matters of the present invention. The specific techniques are described subsequently.

With the present invention, moreover, a plurality of types of base vector are provided, and the ciphertext $C=m_0D_0+m_1D_1+ \ldots +m_{K-1}D_{K-1}$ is produced using a plaintext vector $m=(m_1, m_2, \ldots, m_{K-1}$ that divides the plaintext to be encrypted, a base vector $D=(D_0, D_1, \ldots, D_{K-1})$ configured by selecting the i'th component $D_i$ ($0 \leq i \leq K-1$) from any one of the plurality of types of base vector, and $m_0$ indicating which base vector was selected to provide the i'th components. Thus, while it is easy for an authorized decrypting party to determine which base vector's components $D_i$ have been selected based on the decrypted $m_0$ information, it is extremely difficult for an attacking party to find out which base vector's components $D_i$ have been selected, whereupon attack by the LLL method is made exceedingly difficult. As a consequence, security is enhanced.

DETAILED DESCRIPTION OF THE INVENTION

Concrete examples of the present invention are now given for embodying aspects of the present invention.

Figure 1:
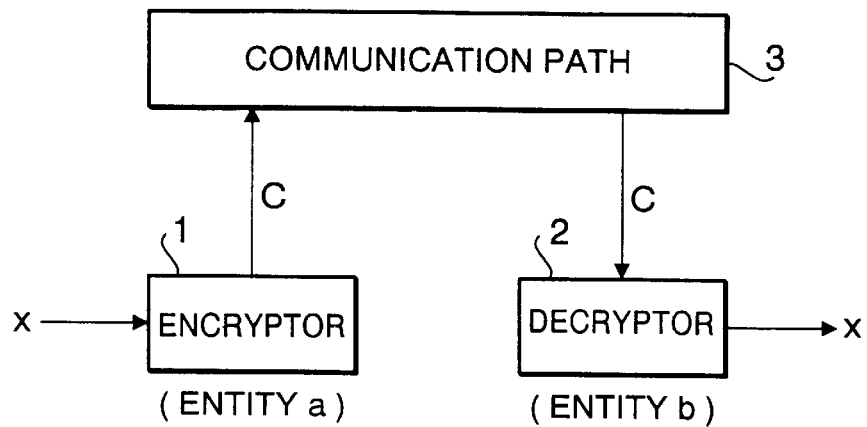
FIG. 1 is a model diagram representing how information is communicated between two entities (or two persons)

FIG. 1 is a model diagram representing a situation wherein an encryption/decryption method of the present invention is employed in communicating information between two entities a and b. In the example diagramed in FIG. 1, one entity a uses an encryptor 1 to encrypt plaintext x into ciphertext C. This ciphertext C is transmitted to the other entity b over a communication path 3, and entity b uses a decryptor 2 to decrypt that ciphertext C back into the original plaintext x.

First Embodiment

A secret key and a public key are prepared as follows.

Secret key: $\{d_i\}$, P, w

Public key: $\{c_i\}$

The base is given as in equation (2) noted earlier. In this case, the base vector $\{D_i\}$ is not a super-increasing sequence, and is highly resistive to attack by the LLL method. An integer w is randomly selected which satisfies w<P (where P is a large prime number). Further, the elements $m_i$ in the message vector m are set so that $m_i<d_i$ is satisfied. The public key vector c is derived from the components of D using the integer w, as in the equations (4) and (5).

$$c_i \equiv wD_i \pmod{P} \tag{4}$$

$$c=(c_0, c_1, \ldots, c_{K-1}) \tag{5}$$

Also, $\mu$ satisfying that $\mu<\min(d_0, d_1, \ldots, d_{K-1})$ is disclosed to each entity. At the entity a, based on this disclosed $\mu$, the plaintext x is divided into K-dimensional message vectors less than or equal to $\mu$. At the entity a, the inner products of the message vectors m and public key vector c are found as in equation (6), and the plaintext x is encrypted to yield the ciphertext C. The ciphertext C so produced is transmitted over the communication path 3 from entity a to entity b.

$$C=m_0c_0+m_1c_1+ \ldots +m_{K-1}c_{K-1} \tag{6}$$

At the entity b, decryption processing is performed as described below.

First, an intermediate decrypted text M is derived for the ciphertext C as in equation (7).

$$M = w^{-1} C \pmod{P} \tag{7}$$

This intermediate decrypted text M is given specifically by formula (3) noted earlier. Therefore it can be decrypted by the parallel decryption algorithm described earlier. In a case where K types of parallel processing are possible, the ciphertext C can be decrypted at high speed in the time required to execute two multiplication/division processes. In the present invention, moreover, there is no need to decrypt the elements in the message vector in order from the highest digit (or in order from the lowest digit), but a message element in any digit can be freely decrypted in parallel, wherefore parallel communications are made possible.

Now, if we suppose combinations $(d_i, d_j)$ of two numbers $d_i$ and $d_j$, in round-robin fashion, then P will be revealed. That being so, in actual practice, it is necessary to select something on the order of $2^{32} d_i$.

A specific example is now given.

Secret key
    d=(11, 17, 29)
    D=(17·29, 29·11, 11·17)
    =(493, 319, 187)
    P=59659
    w=25252
    $w^{-1} \equiv 48633 \pmod{P}$
    where $D_1$, $D_2$, and $D_3$ do not constitute a super-increasing sequence.

Public key
    c≡wD≡(40164, 1423, 9063) (mod P)

Encryption
    Assume message m=(4, 6, 8).
    C=c·m=241698

Decryption
    Find intermediate decrypted text M and decrypt using parallel decryption algorithm.
    $M \equiv w^{-1} C \equiv 5382 \pmod{59659}$
    $m_0 \equiv 5382 \cdot 493^{-1} \equiv 4 \pmod{11}$
    $m_1 \equiv 5382 \cdot 319^{-1} \equiv 6 \pmod{17}$
    $m_2 \equiv 5382 \cdot 187^{-1} \equiv 8 \pmod{29}$
    In this manner the message m=(4, 6, 8) is obtained.

Second Embodiment

A second embodiment wherein random numbers are added to the first embodiment is described. In the first embodiment, when the sum products of the products of w and $D_i$ are found, the result is multiple products of w and d, as represented in equation (8) below. Thus, the possibility of finding w and d is not exactly zero. That being so, in the second embodiment, security is enhanced by using base vectors produced by multiplying the base vectors used in the first embodiment by random numbers.

$$\prod_{i=0}^{K-1} w D_i = w^K \cdot (d^K / d) \tag{8}$$
$$= w^K \cdot d^{K-1}$$

A secret key and public key are prepared as follows.

Secret key: $\{d_i\}$, $\{v_i\}$, P, w
Public: key: $\{c_i\}$

Using random numbers $v_0, v_1, \ldots, v_{K-1}$ of roughly the same size, base $D_i$ is given as in equation (9).

$$D_i = (d/d_i) \cdot v_i \tag{9}$$

Here, $d_i$ and $v_i$ are prime relative to each other.

Using the integer w, as in the first embodiment, the public key vector c is found as shown below in equations (10) and (11).

$$c_i \equiv w D_i \pmod{P} \tag{10}$$

$$c = (c_0, c_1, \ldots, c_{K-1}) \tag{11}$$

From the inner products of the message vectors m and public key vector c, the ciphertext C is obtained as in the first embodiment (see equation (6) noted earlier).

Decryption processing is performed as follows.

First, an intermediate decrypted text M is derived for the ciphertext C as in equation (12).

$$M \equiv w^{-1} C \pmod{P} \tag{12}$$

This intermediate decrypted text M is given specifically by formula (3) noted earlier, wherefore it can be decrypted by the parallel decryption algorithm as in the first embodiment.

A specific example is now given.

Secret key
    d=(11, 17, 29)
    v=(8, 7, 5)
    D=(2465, 2233, 1496)
    P=59659
    w=25252
    $w^{-1} \equiv 48633 \pmod{P}$ Public key
    c≡wD
    ≡(21843, 9961, 12845) (mod P)

Encryption
    Assume message m=(7, 8, 9).
    C=c·m
    =348194.

Decryption
    Find intermediate decrypted text M and decrypt using parallel decryption algorithm.
    $M \equiv w^{-1} C \equiv 48583 \pmod{59659}$
    $m_0 \equiv 48583 \cdot 2465^{-1} \equiv 7 \pmod{11}$
    $m_1 \equiv 48583 \cdot 2233^{-1} \equiv 8 \pmod{17}$
    $m_2 \equiv 48583 \cdot 1496^{-1} \equiv 9 \pmod{29}$ In this manner the message m=(7, 8, 9) is obtained.

Third Embodiment

In the second embodiment, random numbers are combined together with the base vectors themselves. It is also possible, however, to use the same base vectors as in the first embodiment and add random numbers $v_0, v_1, \ldots, v_{K-1}$ at the stage of producing the ciphertext C. The ciphertext C, in this case, takes on the same form as in the second embodiment.

Fourth Embodiment

A fourth embodiment is described wherein the base vectors used in the first embodiment are multiplexed. This fourth embodiment is an encryption/decryption method wherein base vectors $\{D_i\}$ based on the first embodiment are set for two moduli respectively, and the Chinese remainder theorem is applied.

A secret key and public key are prepared as follows.

Secret key: $\{d_{Pi}\}$, $\{d_{Qi}\}$, P, Q, N, w

Public key: $\{c_i\}$

Two large prime numbers P and Q are selected, and the product thereof is taken as N. Two different sets $\{d_i\}$ comprising K elements each, as in the first embodiment, are prepared and designated $\{d_{Pi}\}$ and $\{d_{Qi}\}$. The basses generated therefrom are designated $\{D_{Pi}\}$ and $\{D_{Qi}\}$. Using the Chinese remainder theorem, a minimum integer $D_i$ is derived such that the remainders from P and Q become $D_{Pi}$ and $D_{Qi}$, respectively.

With N as the modulus, and using a secret random number w, the public key vectors c are found, as in the first embodiment, as represented below in equations (13) and (14).

$$c_i \equiv wD_i \pmod{N} \quad (13)$$

$$c = (c_0, c_1, \ldots, c_{K-1}) \quad (14)$$

From the inner products of the message vectors m and the public key vector c, the ciphertext C is obtained as in the first embodiment (see equation (6) noted earlier).

Decryption processing is performed as follows.

Intermediate decrypted texts $M_P$ and $M_Q$, in modulus P and modulus Q, respectively, are derived for the ciphertext C as in equations (15) and (16).

$$M_P \equiv w^{-1}C \pmod{P} \quad (15),$$

$$M_Q \equiv w^{-1}C \pmod{Q} \quad (16),$$

For these intermediate decrypted texts $M_P$ and $M_Q$, the equations (17) and (18) are established. Here, $m_i$ is given by either equation (19) or equation (20).

$$M_P = m_0^{(P)}D_{P0} + m_1^{(P)}D_{P1} + \ldots + m_{K-1}^{(P)}D_{PK-1} \quad (17)$$

$$M_Q = m_0^{(Q)}D_{Q0} + m_1^{(Q)}D_{Q1} + \ldots + m_{K-1}^{(Q)}D_{PK-1} \quad (18)$$

$$m_i \equiv m_i^{(P)} \pmod{d_{Pi}} \quad (19)$$

$$m_i \equiv m_i^{(Q)} \pmod{d_{Qi}} \quad (20)$$

For $M_P$ and $M_Q$, a pair of remainders $(m_i^{(P)}, m_i^{(Q)})$ can be derived by using a parallel decryption algorithm. When the Chinese remainder theorem is applied to these remainders, the message(s) $m_i < 1$ cm $(d_{Pi}, d_{Qi})$ can be decrypted.

A specific example in the fourth embodiment is now given.

Secret key
  $d_P$=(11, 17, 29)
  $d_Q$=(13, 19, 23)
  $D_P$=(493, 319, 187)
  $D_Q$=(437, 299, 247)
    D=(946872238594, 409641492482, 772314923252)
    P=1042183
    Q=960119
    N=1000619699777
    w=947284758293
    $w^{-1}$≡337608855274 (mod N)

Public key
  c ≡ wD ≡ (940952460514, 717925054865, 870712563437) (mod N)

Encryption
  Assume message m=(45, 67, 89).

C=c·m=167937257544978

Decryption

Find intermediate decrypted texts $M_P$ and $M_Q$ and decrypt using parallel decryption algorithm.

$M_P$=$w^{-1}$C≡60201 (mod 1042183)
$M_Q$=$w^{-1}$C≡61681 (mod 9600119)
$m_0^{(P)}$=$M_P$·$493^{-1}$≡1 (mod 11)
$m_1^{(P)}$=$M_P$·$319^{-1}$≡16 (mod 17)
$m_2^{(P)}$=$M_P$·$187^{-1}$≡2 (mod 29)
$m_0^{(Q)}$=$M_Q$·$437^{-1}$≡6 (mod 13)
$m_1^{(Q)}$=$M_Q$·$299^{-1}$≡10 (mod 19)
$m_2^{(Q)}$=$M_Q$·$247^{-1}$≡20 (mod 23) From $(m_0^{(P)}, m_0^{(Q)})$, $m_0$=45 is found by the Chinese remainder theorem. Similarly, from $(m_1^{(P)}, m_1^{(Q)})$ and $(m_2^{(P)}, m_2^{(Q)}$, $m_1$=67 and $m_2$=89 are found.

In this manner the message m=(45, 67, 89) is obtained.

Furthermore, with a multiplexing method such as this fourth embodiment, wherein a composite number N is taken as the modulus, it is thought to be safe to disclose N in cases where it is very difficult to analyze N prime factors. Accordingly, in such cases, encryption efficiency can be improved by sending ciphertext C derived using N as the modulus.

Fifth Embodiment

A fifth embodiment is an encryption scheme wherein random numbers are added to the fourth embodiment, that is, an encryption scheme wherein the base vectors in the second embodiment are multiplexed. Because this fifth embodiment will be readily understood by referring to the first to fourth embodiments described in the foregoing, it is not further described here.

Sixth Embodiment

In the fourth embodiment, a multiplexing scheme is described using two prime numbers. However, multiplexing may be done employing three or more prime numbers. A sixth embodiment is now described wherein L prime numbers $P_0, P_1, \ldots, P_{L-1}$ are used. If, therein, $P_0$=P and $P_1$=Q this becomes identical with the fourth embodiment.

A secret key and public key are prepared as follows.

Secret key: $\{P_j\}$, $\{r_{j,i}\}$, w

Public key: $\{c_i\}$

For the prime numbers $P_j$ (j=0, 1, ..., L−1), vectors $D_{Pj}$ similar to $D_P$ and $D_Q$ in the fourth embodiment are provided as in equation (21).

$$D_{Pj} = (r_j/r_{j,0}, r_j/r_{j,1}, \ldots, r_j/r_{j,i}, \ldots, r_j/r_{j,K-1}) \quad (21)$$

where: $r_j = r_{j,0}, r_{j,1}, \ldots, r_{j,K-1}$

Now, by applying the Chinese remainder theorem, a base is obtained, with the smallest integer made $D_i$ as in equation (22).

$$D_i \equiv D_{Pj,i} \pmod{P_j} \quad (22)$$

With $N = P_0 P_1 \ldots P_{L-1}$ as the modulus, the public key c is prepared as in the first embodiment.

In this sixth embodiment, as compared to the first embodiment, what might be called a two-dimensional structure is incorporated. When this is done, the following benefits may be expected.

(1) When K=L, a message can only be decrypted when $K^2$ parameters are employed. When a comparison is made with the dimension number K made the same, a safer system is realized.

(2) Similarly, when K=L, and a vector wherein $D_{P0}$ given in equation (23) is cyclically substituted j times is used as $D_{Pj}$, the circuitry can be simplified.

$$D_{P0}=(r_0/r_{0,0}, r_0/r_{0,1}, \ldots, r_0/r_{0,K-1}) \quad (23)$$

In this sixth embodiment, moreover, when $r_{j,i}$ is made about 16 bits and K=L=8, the size of the public key becomes approximately 8.2 kilobits and the number of secret parameters becomes 74.

Seventh Embodiment

Secret keys and public keys are prepared as follows.

Secret keys: $\{d_{P1i}\}, \{d_{P2i}\}, \ldots, \{d_{Pni}\}$
(where i=0, 1, ..., K−1)
$\{d_{Q1i}\}, \{d_{Q2i}\}, \ldots, \{d_{Q1i}\}$
$N=P_1P_2 \ldots P_n$
$L=Q_1Q_2 \ldots Q_1$
Public keys: $c_i^{(N)} \equiv c_i \pmod{N}$
$c_i^{(NL)} \equiv c_i \pmod{NL}$
$\{e_{Ni}\}$
$\{e_{Li}\}$ Prior to encrypting, at the transmitting entity a, K sequences $a_i \in GF(2)$ are randomly generated, and a K-dimensional binary vector I given below is generated.

vector $I=(a_1, a_2, \ldots, a_{K-1})$

Further, using the bases of two types of public keys disclosed, a K-dimensional base vector c' as given below is generated.

vector $c'=(c_0', c_1', \ldots, c_{K-1}')$

Here, either $c_i^{(N)}$ or $c_i^{(NL)}$ is selected as $\{c_i'\}$ according to the following criteria.

$c_0'=c_0^{(N)}$ (i=0)

$c_i'=c_i^{(N)}$ ($a_i=0$) (i≧1)

$c_i'=c_i^{(NL)}$ ($a_i=1$) (i≧1)

A plain vector $m=(m_1, m_2, \ldots, m_{K-1})$ which (m−1)-divides the plaintext x to be encrypted is generated, and a message vector m' is generated that is combined with the binary vector I, noted above, which indicates whether $c_i^{(N)}$ or $c_i^{(NL)}$ is selected therefor. This message vector m' is represented as follows.

vector $m'$=(vector $I, m_1, m_2, \ldots, m_{K-1}$)

Here, the size of this vector m' is represented as follows.

$|\text{vector } I|=e_{N0}$ $|m_i|=e_{Ni}(a_i=0)$ $|m_i|=e_{Ni}+e_{Li} (a_i=1)$

Settings are made, moreover, so as to satisfy the following conditions.

$2^{e_{Ni}} \leq 1 \text{ cm } (d_{P1i}, d_{P2i}, \ldots d_{Pni}) < 2^{e_{Ni}+1}$ $2^{e_{Li}} \leq 1 \text{ cm } (d_{Q1i}, d_{Q2i}, \ldots d_{Qni}) < 2^{e_{Li}+1}$ Then, at the transmitting entity a, the vector I is set as $m_0$, and, using this $m_0$, the components of the plaintext vector m, and the components of the selected base vector c', ciphertext C is generated as follows.

$C=m_0c_0'+m_1c_1'+m_{K-1}c_{K-1}'$

This ciphertext C can also be represented as follows.

$C=C_N'+C_{NL}'$

Here, $C_N'$ is that portion of the message vector m' which is encrypted by $c_i^{(N)}$, and $C_{NL}'$ is the remaining portion of the message vector m' which is encrypted by $c_i^{(NL)}$.

The ciphertext C generated as described in the foregoing is transmitted from the transmitting entity a to the receiving entity b over the communication path 3. When this is done, the transmission capacity is not constant in all of the blocks (the components of the message vector m'). The transmission capacity of $M_0$ is $e_{N0}$ bits, while the transmission capacity of $m_i$ (i≧1) is either $e_{Ni}$ bits or ($e_{Ni}+e_{Li}$) bits.

At the receiving entity b, decryption processing is performed as follows. When, for the ciphertext C, the portion of the message decrypted using the public key vector $c^{(N)}=(c_0^{(N)}, \ldots, c_{K-1}^{(N)})$ with mod N is named $M_N'$, $M_N'$ is represented as follows.

$M_N'=(m_0^{(N)}, m_1^{(N)}, \ldots, m_{K-1}^{(N)})$

Here, the first block $m_0^{(N)}$ of the decrypted message becomes equal to the vector I, wherefore the receiving entity b can obtain information concerning $\{a_i\}$. This makes it possible to know which term the public key $c_i^{(N)}$ has been used in. Therefore, there is no need to perform further decryption on the set of message portions $\{m_i^{(N)} | a_i=0\}$ decrypted from the ciphertext $C_N'$ that is part of the ciphertext C. Accordingly, some of the components of the original plaintext vector m corresponding thereto can be extracted.

Following that, decryption is performed on the result of subtracting from the transmitted ciphertext C the ciphertext $C_N'$ (the ciphertext $C_N'$ is obtained by multiplying the extracted components by the public key $c_i^{(N)}$ i.e., the decryption is performed on the ciphertext $C_{NL}'$), using the public key vector $c^{(NL)}=(c_1^{(NL)}, \ldots, c_{K-1}^{(NL)})$ with mod NL, whereby it is possible to find the remaining components of the original plaintext vector m corresponding to the remaining component set $\{m_i^{(NL)} | a_i 1=\}$.

In the example described above, N and L are products of a plurality of integers, but of course these may be single integers.

In this example, moreover, the encryption is conducted with two types of sending capacity, using the two types of integers N and NL, but the encryption can of course be performed equivalently even with three or more types of integers in cases where those integers have common factors (as, for example, N, NL, and NLR).

Thus, with the encryption/decryption methods of the present invention, the sending entity arbitrarily selects the key used for encrypting from a plurality of public keys. Consequently, it is extremely difficult for an attacking party to infer which public key has been selected by the sending entity, and it is in fact impossible for an attacking party to resolve the plaintext from the ciphertext and public keys using the LLL method. An authorized receiving entity, on the other hand, can be cognizant of selection information on which public key has been selected by the sending entity and therefore perform decryption correctly.

Figure 2:
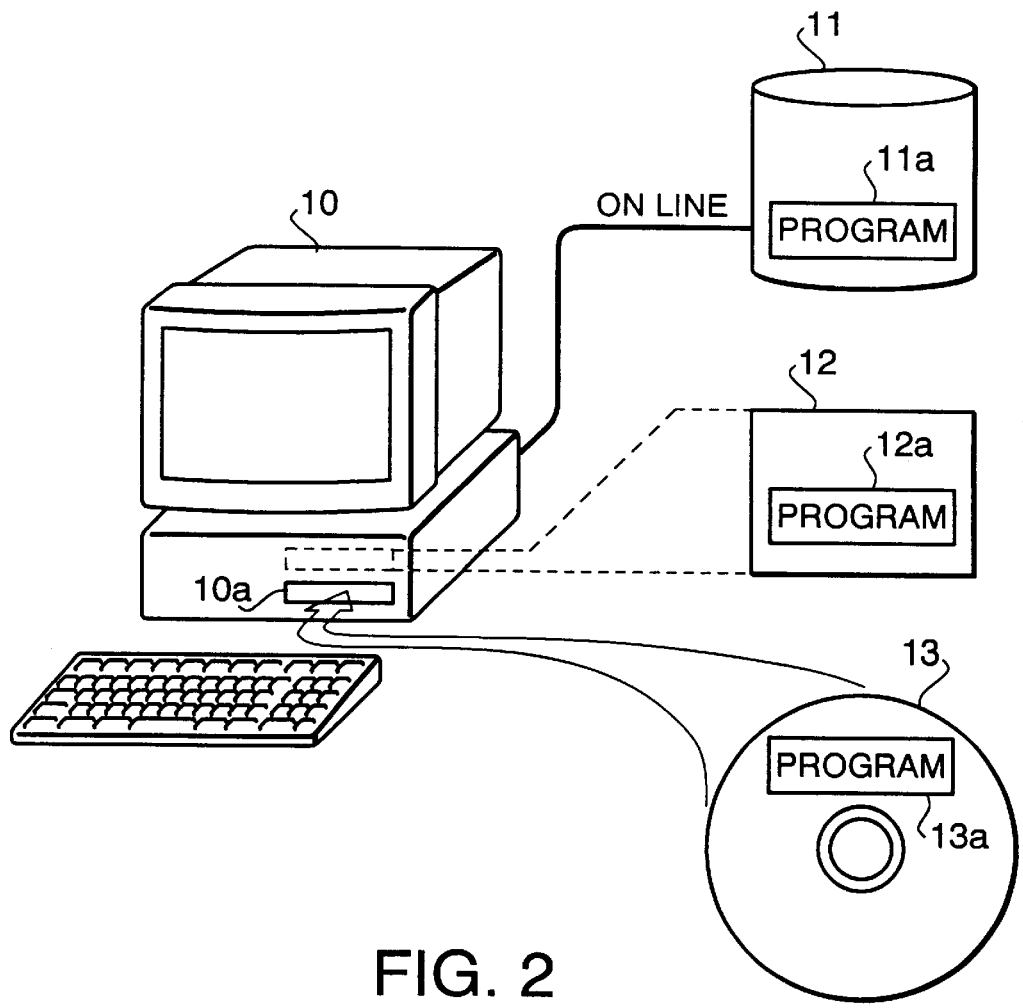
FIG. 2 illustrates computer usable media (recording media) according to the present invention.

FIG. 2 is a diagram for embodying aspects of computer usable media of the present invention. The term "computer usable medium" in this specification including the appended claims covers any physical object in which the program to be executed by CPU or the like is stored. For example, the term "computer usable medium" includes a floppy disk, CD-ROM, hard disk drive, ROM, RAM, an optical recording medium such as DVD, a photomagnetic recording medium such as MO, a magnetic recording medium such as magnetic tape, and a semiconductor memory such as IC card and a miniature card. A program for having CPU or the like execute a part or all of the operations described herein may, be stored in the "computer usable medium".

The program exemplified, here is recorded on the computer usable media described below. That program comprises: a process routine for (K−1)-dividing plaintext to obtain a plaintext vector $m=(m_1, m_2, \ldots, m_{K-1})$; a process routine for setting a plurality of types of base vector $D=(D_0 D_1, \ldots, D_{K-1})$ wherein $D_i$ ($0 \leq i \leq K-1$) is set to $D_i=d/d_i$ (where $d=d_0 d_1 \ldots d_{K-1}$); a process routine for generating $m_0$ as a binary vector indicating from which base vector the i'th component is selected as $D_i$; and a process routine for producing ciphertext C using that $m_0$, the plaintext vector m, and the selected $D_i$. A computer or CPU 10 is provided at the sending entity.

In FIG. 2, a first computer usable medium 11, which is connected on-line to the computer 10, is constituted by for example a World Wide Web (WWW) server, computer, which is installed at a location distant from the computer 10. A program 11a like that described above is stored on the computer usable medium 11. The computer 10 prepares a ciphertext C in accordance with the program 11a, which is read out from the computer usable medium 11.

A second computer usable medium 12 disposed on the inside of the computer 10 is constituted by, for example, either a hard disk drive or ROM which is installed internally. A program 12a like that described above is stored on the computer usable medium 12. The computer 10 prepares a ciphertext C in accordance with the program, 12a which is retrieved from the second computer usable medium 12.

A third computer usable medium 13 which is inserted in a disk drive 10a disposed in the computer to is constituted by, for example, a transportable magneto-optic disk, CD-ROM or flexible disk, and a program 13a like that described above is stored on the third computer usable medium 13. The computer 10 prepares a ciphertext C in accordance with the program 13a which is read out from the computer usable medium 13.

With the present invention, as described in the foregoing, the base $D_i$ used when performing encryption is set to $D_i=d/d_i$ (where $d=d_0 d_1 \ldots d_{K-1}$) wherefore the elements of the plaintext vector can be decrypted in parallel, and high-speed decryption can be performed with a simple hardware configuration. The present invention can therefore contribute greatly to opening the way for the practical implementation of product-sum type cryptosystem.

With the present invention, furthermore, ciphertext is configured using a base freely selected from among a plurality of preset base vectors. Therefore, the selection information pertaining thereto cannot be discovered, attack by the LLL method is made extremely difficult, and security can be enhanced. This aspect of the present invention also greatly contributes to opening the way for the practical implementation of product-sum type cryptosystem.

The above described encryption method, decryption method, encryption/decryption method, cryptographic communications system and computer readable medium are disclosed in Japanese Patent Application Nos. 10-262037 and 11-105814 filed in Japan on Sep. 16, 1998 and Apr. 13, 1999 respectively, the subject application claims priority of these two Japanese Patent Applications and the entire disclosures thereof are incorporated herein by reference.

What is claimed is:

1. An encryption method comprising the steps of:
providing a plaintext vector $m=(m_0, m_1, \ldots m_{K-1})$ that is obtained by dividing plaintext by K;
providing base vectors $D=(D_0, D_1, \ldots D_{K-1})$, with $D_i$ ($0 \leq i \leq K-1$) being set to $D_i=d/d_i$ (where $d=d_0 d_1 \ldots d_{K-1}$, and any two numbers $d_i$ and $d_j$ are prime relative to each other); and
yielding ciphertext $C=m_0 D_0 + m_1 D_1 + \ldots + m_{K-1} D_{K-1}$ from the plaintext vector m and base vectors D.

2. The encryption method according to claim 1 further including the step of using a random number vector $v=(v_0, v_1, \ldots, v_{K-1})$ to yield ciphertext $C=m_0 v_0 D_0 + m_1 v_1 D_1 + \ldots + m_{K-1} v_{K-1} D_{K-1}$.

3. The encryption method according to claim 1 further including the step of providing a plurality of sets each containing K terms of $d_i$ (i=0, 1, 2, ..., K−1) elements, and wherein the ciphertext is obtained for each of those sets, respectively.

4. An encryption method comprising the steps of:
providing a plaintext vector $m=(m_0, m_1, \ldots, m_{K-1})$ that is obtained by dividing plaintext by K;
providing base vectors $D=(D_0, D_1, \ldots, D_{K-1})$, with $D_1$ ($0 \leq i \leq K-1$) being set to $D_i=d/d_i v_i$ (where $d=d_0 d_1 \ldots d_{K-1}$, and $v_i$ is a random number); and
yielding ciphertext $C=m_0 D_0 + m_1 D_1 + \ldots + m_{K-1} D_{K-1}$ from the plaintext vector m and base vectors D.

5. The encryption method according to claim 4 further including the step of providing a plurality of sets each containing K terms of $d_i$ (i=0, 1, 2 ... K−1) elements, and wherein the ciphertext is obtained for each of those sets, respectively.

6. A decryption method for decrypting ciphertext C encrypted by any one of the following three encryption methods, the decryption method including the step of finding a plaintext vector $m=(m_0, m_1, \ldots, m_{K-1})$ by formula (a) below, and the step of obtaining an original plaintext from the plaintext vector m:

$$m_i = C D_i^{-1} \pmod{d_i} \tag{a},$$

the first encryption method including the steps of:
providing a plaintext vector $m=(m_0, m_1, \ldots, m_{K-1})$ that is obtained by dividing plaintext by K,
providing base vectors $D=(D_0, D_1, \ldots, D_{K-1})$, with $D_i$ ($0 \leq i \leq K-1$) being set to $D_1 = d/d_i$ (where $d=d_0 d_1 \ldots d_{K-1}$, and any two numbers $d_i$ and $d_j$ are prime relative to each other), and
yielding ciphertext $C=m_0 D_0 + m_1 D_1 + \ldots + m_{K-1} D_{K-1}$ from the plaintext vector m and base vectors D,
the second encryption method including the steps of:
providing a plaintext vector $m=(m_0, m_1, \ldots, m_{K-1})$ that is obtained by dividing plaintext by K;
providing base vectors $D=(D_0, D_1, \ldots, D_{K-1})$, with $D_1$ ($0 \leq i \leq K-1$) being set to $D_i=d/d_i v_i$ (where $d=d_0 d_1 \ldots d_{K-1}$, any two numbers $d_i$ and $d_j$ are prime relative to each other, and $v_i$ is a random number); and
yielding ciphertext $C=m_0 D_0 + m_1 D_1 + \ldots + m_{K-1} D_{K-1}$ from the plaintext vector m and base vectors D, and
the third encryption method including the steps of:
providing a plaintext vector $m=(m_0, m_1, \ldots, m_{K-1})$ that is obtained by dividing plaintext by K,
providing base vectors $D=(D_0, D_1, \ldots, D_{K-1})$, with $D_i$ ($0 \leq i \leq K-1$) being set to $D_i=d/d_i$ (where $d=d_0 d_1 \ldots d_{K-1}$, and any two numbers $d_i$ and $d_j$ are prime relative to each other), providing a random number vector $v=(v_0, v_1, \ldots, v_{K-1})$, and yielding ciphertext $C=m_0v_0D_0+m_1v_1D_1+ \ldots +m_{K-1}v_{K-1}D_{K-1}$ from the plaintext vector m, base vectors D, and random number vector v.

7. An encryption/decryption method comprising the steps of:

providing a plaintext vector $m=(m_0, m_1, \ldots, m_{K-1})$ that K-divides plaintext;

providing base vectors $D=(D_0, D_1, \ldots, D_{K-1})$, with $D_i$ ($0 \leq i \leq K-1$) being set to $d/d_i$ using an integer $d_i$, (where $d=d_0d_1 \ldots d_{K-1}$, and any two numbers $d_i$ and $d_j$ are prime relative to each other);

selecting w to satisfy w<P (where P=prime number) and finding a public key vector $c=(c_0, c_1, \ldots, c_{K-1})$ from formula (b):

$$c_i \equiv wD_i \pmod{P} \qquad (b);$$

producing ciphertext C indicated in formula (c) from inner product of the plaintext vector m and public key vector c:

$$C=m_0c_0+m_1c_1+m_{K-1}v_{K-1}c_{K-1} \qquad (c);$$

finding intermediate decrypted text M for said ciphertext C as in formula (d):

$$M \equiv w^{-1} C \pmod{P} \qquad (d);$$

finding said plaintext vector $m=(m_0, m_1, \ldots, m_{K-1})$ by decrypting said intermediate decrypted text M by formula (e) below:

$$m_i \equiv MD_i^{-1} \pmod{d_i} \qquad (e); \text{ and}$$

obtaining the original plaintext from the plaintext vector m.

8. An encryption/decryption method comprising the steps of:

providing a plaintext vector $m=(m_0, m_1, \ldots, m_{K-1})$ that K-divides plaintext;

providing base vectors $D=(D_0, D_1, \ldots, D_{K-1})$, with $D_i$ ($0 \leq i \leq K-1$) being determined with equation (f):

$$D_i=d/d_iv_i \qquad (f)$$

where $v_i$ is a random number,
$d_i$ is an integer, and
$d=d_0d_1 \ldots d_{K-1}$, with any two integers $d_i$ and $d_j$ being prime relative to each other;

selecting w to satisfy w<P (where P=prime number), and finding a public key vector $c=(c_0, c_1, \ldots, c_{K-1})$ from formula (g):

$$c_i \equiv wD_i \pmod{P} \qquad (g);$$

producing ciphertext C indicated in formula (h) from inner product of the plaintext vector m and public key vector c:

$$C=m_0c_0+m_1c_1+ \ldots +m_{K-1}c_{K-1} \qquad (h);$$

finding intermediate decrypted text M for said ciphertext C as in formula (i):

$$M \equiv w^{-1}C \pmod{P} \qquad (i);$$

finding said plaintext vector $m=(m_0, m_1, \ldots, m_{K-1})$ by decrypting said intermediate decrypted text M by formula (j) below:

$$m_i \equiv MD_i^{-1} \pmod{d_i} \qquad (j); \text{ and}$$

obtaining the original plaintext from the plaintext vector m.

9. An encryption/decryption method comprising the steps of:

providing a plaintext vector $m=(m_0, m_1, \ldots, m_{K-1})$ that K-divides plaintext;

finding prime numbers P and Q;

providing a base vector $D=(D_0, D_1, \ldots D_{K-1})$ by setting $D_{Pi}$ ($0 \leq i \leq K-1$) to satisfy $D_{Pi}=d_P/d_{Pi}$, using an integer $d_{Pi}$, (where $d_P=d_{P0}d_{P1} \ldots d_{PK-1}$, and any two numbers $d_{Pi}$ and $d_{Pj}$ are prime relative to each other);

providing another base vector $D=(D_0, D_1, \ldots, D_{K-1})$ by setting $D_{Qi}$ ($0 \leq i \leq K-1$) to satisfy $D_{Qi}=d_P/d_{Qi}$ using an integer $d_{Qi}$, (where $d_{Q=dQ0}d_{Q1} \ldots d_{QK-1}$, and any two numbers $d_{Qi}$ and $d_{Qj}$ are prime relative to each other);

deriving a minimum integer $D_i$ such that remainders resulting by P and Q become $D_{Pi}$ and $D_{Qi}$, respectively, using Chinese remainder theorem;

selecting w to satisfy w<N (where N=PQ) and finding a public key vector $c=(c_0, c_1, \ldots, c_{K-1})$ from formula (k):

$$c_i \equiv wD_i \pmod{N} \qquad (k);$$

producing ciphertext C indicated in formula (1) from inner product of the plaintext vector m and public key vector c:

$$C=m_0c_0+m_1c_1+ \ldots +m_{K-1}c_{K-1} \qquad (l);$$

finding intermediate decrypted text $M_P$ and $M_Q$, with modulus P and modulus Q, for said ciphertext C, as in formulas (m) and (n):

$$m_P \equiv w^{-1} C \pmod{P} \qquad (m);$$
$$m_Q \equiv w^{-1}C \pmod{Q} \qquad (n);$$

finding a pair of remainders ($mi^{(P)}$, $mi^{(Q)}$) by decrypting said intermediate decrypted texts $M_P$ and $M_Q$ by formulas (o) and (p) below:

$$mi^{(P)}=M_PD_{Pi}^{-1} \pmod{d_{Pi}} \qquad (o),$$
$$mi^{(Q)}=M_QD_{Qi}^{-1} \pmod{d_{Qi}} \qquad (p);$$

applying Chinese remainder theorem to $mi^{(P)}$ and $mi^{(Q)}$ to determine the plaintext vector $m=(m_0, m_1, \ldots, m_{K-1})$; and obtaining the original plaintext from the plaintext vector m.

10. The encryption/decryption method according to claim 9, wherein said ciphertext C is sent with said N as modulus.

11. A cryptographic communications system for conducting information communications between a plurality of entities using ciphertext, comprising:

an encryptor for producing ciphertext from plaintext using an encryption method, the encryption method including the steps of:

providing a plaintext vector $m=(m_0, m_1, \ldots, m_{K-1})$ that is obtained by dividing plaintext by K, providing base vectors $D=(D_0, D_1, \ldots D_{K-1})$, with $D_i$ ($0 \leq i \leq K-1$) being set to $D_i=d/d_i$ (where $d=d_0d_1 \ldots d_{K-1}$, and any two numbers $d_i$ and $d_j$ prime relative to each other), and yielding ciphertext $C=m_0D_0+m_1D_1+ \ldots +m_{K-1}D_{K-1}$ from the plaintext vector m and base vectors D, a communication path for transmitting said ciphertext one entity to another entity or entities; and a decryptor for decrypting said ciphertext so transmitted to original plaintext.

12. The cryptographic communications system according to claim 11, wherein the encryption method further includes the step of providing a plurality of sets each containing K terms of $d_i$ (i=0, 1, 2, ..., K-1) elements, and the ciphertext is obtained for each of those sets, respectively.

13. A cryptographic communications system for conducting information communications between a plurality of entities using ciphertext, comprising:

an encryptor for producing ciphertext from plaintext using an encryption method, the encryption method including:

providing a plaintext vector $m=(m_0, m_1, \ldots, m_{K-1})$ that is obtained by dividing plaintext by K, providing base vectors $D=(D_0, D_1, \ldots D_{K-1})$, with $D_i(0 \leq i \leq K-1)$ being set to $D_i=(d/d_i) v_i$ (where $d=d_0d_1 \ldots d_{K-1}$, any two numbers $d_i$ and $d_j$ are prime relative to each other), and $v_i$ is a random number), and yielding ciphertext $C=m_0D_0+m_1D_1+ \ldots +m_{K-1}D_{K-1}$ from the plaintext vector m and base vectors D, a communication path for transmitting said ciphertext from one entity to another entity or entities; and a decryptor for decrypting said ciphertext so transmitted to original plaintext.

14. The cryptographic communications system according to claim 13, wherein the encryption method further includes the step of providing a plurality of sets each containing K terms of $d_i$ (i=0, 1, 2, ..., K-1) elements, and the ciphertext is obtained for each of those sets, respectively.

15. A cryptographic communications system for conducting information communications between a plurality of entities using ciphertext, comprising:

an encryptor for producing ciphertext from plaintext using an encryption method, the encryption method including the steps of:

providing a plaintext vector $m=(m_0, m_1, \ldots, m_{K-1})$ that is obtained by dividing plaintext by K, providing base vectors $D=(D_0, D_1, \ldots D_{K-1})$ with $D_i(0 \leq i \leq K-1)$ being set to $D_i=(d/d_i)$ (where $d=d_0d_1 \ldots d_{K-1}$, any two numbers $d_i$ and $d_j$ are prime relative to each other), providing a random number vector $v=(v_0, v_1, \ldots, v_{K-1})$, and yielding ciphertext $C=m_0v_0D_0+m_1v_1D_1+ \ldots +m_{K-1}v_{K-1}D_{K-1}$ from the plaintext vector m, base vectors D and random number vector v;

a communication path for transmitting said ciphertext from one entity to another entity or entities; and a decryptor for decryption said ciphertext so transmitted to original plaintext.

16. An encryption method comprising the step of:

providing components of a plaintext vector, the plaintext vector being obtained by dividing plaintext;

providing components of one of a plurality of types of base vectors; and providing ciphertext from the components of the plaintext vector and the components of the one of the plurality of types of base vectors in such a manner that said ciphertext contains information indicative of which base vector component has been used.

17. An encryption method for obtaining ciphertext from plaintext, comprising the step of:

providing a plaintext vector $m=(m_1, m_2, \ldots, m_{K-1})$ that (K-1)-divides a plaintext;

providing first base vectors $D_P=(D_{P0}, D_{P1}, \ldots, D_{PK-1})$ which is set to $D_{Pi}=d_{P0}d_{P1} \ldots d_{PK-1}/d_{Pi}$ with an integer $d_{Pi}(0 \leq i \leq K-1)$, and second base vectors $D_Q=(D_{Q0}, D_{Q1}, \ldots, D_{QK-1})$ which is set to $D_{Qi}=d_{Q0}d_{Q1} \ldots d_{QK-1}/d_{Qi}$ with an integer $d_{Qi}(0 \leq i \leq K-1)$;

discretionarily selecting either $D_{Pi}$ or $D_{Qi}$ as $D_i$; and obtaining ciphertext $c=m_0D_0+m_1D_1+ \ldots +m_{K-1}D_{K-1}$ from the plaintext vector m and selected base vector $D_i$, with $m_0$ indicating $D_{Pi}/D_{Qi}$ selection information.

18. A method for decrypting ciphertext C encrypted by an encryption method, the encryption method including the step of:

providing a plaintext vector $m=(m_1, m_2, \ldots, m_{K-1})$ that (K-1)-divides a plaintext;

providing first base vectors $D_P=(D_{P0}, D_{P1}, \ldots, D_{PK-1})$ which is set to $D_{Pi}=d_{P0}d_{P1} \ldots d_{PK-1}/d_{Pi}$ with an integer $d_{Pi}(0 \leq i \leq K-1)$, and second base vectors $D_Q=(D_{Q0}, D_{Q1}, \ldots, D_{QK-1})$ which is set to $D_{Qi}=d_{Q0}d_{Q1} \ldots d_{QK-1}/d_{Qi}$ with an integer $d_{Qi}(0 \leq i \leq K-1)$, discretionarily selecting either $D_{Pi}$ or $D_{Qi}$ as $D_i$; and obtaining ciphertext $c=m_0D_0+m_1D_1+ \ldots +m_{K-1}D_{K-1}$ from the plaintext vector m and selected base vector $D_i$, with $m_0$ indicating $D_{Pi}/D_{Qi}$ selection information, the decryption method comprising the steps of:

decrypting those components of the plaintext vector m which form products with $D_{Pi}$ in said ciphertext C and said $m_0$; and decrypting those components of said plaintext vector m which form products with $D_{Qi}$ in said ciphertext C.

19. An encryption method for yielding ciphertext from a plaintext vector $m=(m_1, m_2, \ldots, m_{K-1})$ that (K-1)-divides plaintext, and base vectors $D=(D_0, D_1, \ldots, D_{K-1})$, comprising the steps of:

providing a plurality of types of base vector, the base vectors $d_i(0 \leq i \leq K-1)$ which is set to $D_i=d/d_i$ (where $d=d_0d_1 \ldots d_{K-1}$);

selecting i'th component of anyone base vector of said plurality of types of base vector as $D_i$; and obtaining ciphertext $C=m_0D_0+m_1D_1+ \ldots +m_{K-1}D_{K-1}$ from the plaintext vector m and selected base vector $D_i$, with $m_0$ indicating $D_i$ selection information.

20. A cryptographic communications system for conducting information communications between a plurality of entities using ciphertext, comprising:

an encryptor for producing ciphertext from plaintext using an encryption method, the encryption method including the steps of:

providing components of a plaintext vector, the plain text vector being obtained by dividing plaintext, providing components of one of a plurality of types of base vectors, and providing ciphertext from the components of the plaintext vector and the components of the one of the plurality of types of base vectors in such a manner that said ciphertext containing information indicative of which base vector component has been used;

a communication path for transmitting said ciphertext from one entity to another entity or entities; and a decryptor for decrypting said ciphertext so transmitted to original plaintext.

21. A cryptographic communications system for conducting information communications between a plurality of entities using ciphertext, comprising:

an encryptor for producing ciphertext from plaintext using an encryption method, the encryption method including the steps of:

providing a plaintext vector $m=(m_1, m_2, \ldots, m_{K-1})$ that (K−1)-divides a plaintext;

providing first base vectors $D_P=(d_{P0}, d_{P1}, \ldots, d_{PK-1})$ and second base vectors $D_Q=(D_{Q0}, D_{Q1}, \ldots, D_{QK-1})$, with the first base vectors $D_P$ being set to $d_{Pi}=d_{P0}d_{P1} \ldots d_{PK-1}/d_{Pi}$ utilizing integers $d_{Pi}$ ($0 \leq i \leq K-1$), and the second base vectors $D_Q$ being set to $D_{Qi}$ ($0 \leq i \leq K-1$) $D_{Qi}=d_{Q0}d_{Q1} \ldots d_{QK-1}/d_{Qi}$ with an integer $d_{Qi}$ ($0 \leq i \leq K-1$), discretionarily selecting either $D_{Pi}$ or $D_{Qi}$ as $D_i$; and obtaining ciphertext $c=m_0D_0+m_1D_1+ \ldots +m_{K-1}D_{K-1}$ from the plaintext vector m and selected base vector $D_i$, with $m_0$ indicating $D_{Pi}/D_{Qi}$ selection information, a communication path for transmitting said ciphertext from one entity to another entity or entities; and a decryptor for decrypting said ciphertext so transmitted to original plaintext.

22. A cryptographic communications system for conducting information communications between a plurality of entities using ciphertext, comprising:

an encryptor for producing ciphertext from plaintext using an encryption method, the encryption method including the steps of:

providing a plaintext vector $m=(m_1, m_2, \ldots, m_{K-1})$ that (K−1)-divides plaintext, providing a plurality of types of base vectors, each base vector $D=(D_0, D_1, \ldots, D_{K-1})$, with said $D_i$ ($0 \leq i \leq K-1$) being set to $D_i=d_{Pi}$ (where $d=d_0d_1 \ldots d_{K-1}$), selecting i'th component of anyone base vector of said plurality of types of base vector as $D_i$, and obtaining ciphertext $C=m_0D_0+m_1D_1+ \ldots +m_{K-1}D_{K-1}$, from the plaintext vector m and the selected base vector $D_i$, with $m_0$ indicating $D_i$ selection information;

a communication path for transmitting said ciphertext from one entity to another entity or entities; and a decryptor for decrypting said ciphertext so transmitted to original plaintext.

23. A computer readable medium adapted to store a program for obtaining ciphertext from plaintext by a computer, comprising:

first program code means for causing said computer to (K−1)-divide plaintext to be encrypted so as to obtain a plaintext vector $m=(m_1, m_2, \ldots, M_{K-1})$;

second program code means for causing said computer to set a plurality of types of base vectors $D=(D_0, D_1, \ldots, D_{K-1})$ wherein $D_i$ (where $0 \leq i \leq K-1$) is set to $D_i=d/d_i$ (where $d=d_0d_1 \ldots d_{K-1}$);

third program code means for causing said computer to generate $m_0$ as a binary vector indicating of which base vector an i'th component is selected as $D_i$; and fourth program code means for causing said computer to generate ciphertext $C=m_0D_0+m_1D_1+ \ldots +m_{K-1}D_{K-1}$ using said $m_0$, plaintext vector m and selected $D_i$.

* * * * *